United States Patent
Ha et al.

(10) Patent No.: US 11,493,916 B2
(45) Date of Patent: Nov. 8, 2022

(54) METHOD AND APPARATUS FOR USING DRONE IN MOVING OBJECT

(71) Applicants: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

(72) Inventors: Jae Jun Ha, Hwaseong-si (KR); Ilsoo Yun, Yongin-si (KR); Seungkyu Ryu, Suwon-si (KR); Sangmin Park, Chungcheongnam-do (KR); Sungho Park, Yongin-si (KR); Harim Jeong, Suwon-si (KR); Cheolwoo Kwon, Suwon-si (KR); Jiwon Kim, Suwon-si (KR); Kiyeon Park, Suwon-si (KR)

(73) Assignees: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 221 days.

(21) Appl. No.: 16/909,037

(22) Filed: Jun. 23, 2020

(65) Prior Publication Data
US 2020/0401128 A1 Dec. 24, 2020

(30) Foreign Application Priority Data
Jun. 24, 2019 (KR) .................. 10-2019-0075262

(51) Int. Cl.
*G05D 1/00* (2006.01)
*H04W 4/42* (2018.01)
(Continued)

(52) U.S. Cl.
CPC ............ *G05D 1/0016* (2013.01); *B60R 11/00* (2013.01); *B60R 21/16* (2013.01); *B60W 40/08* (2013.01);
(Continued)

(58) Field of Classification Search
CPC .. G05D 1/0016; G05D 1/0022; G05D 1/0027; G05D 1/005; G05D 1/0094;
(Continued)

(56) References Cited

U.S. PATENT DOCUMENTS

2016/0016663 A1* 1/2016 Stanek ................ G05D 1/0276
701/3
2018/0155057 A1* 6/2018 Irish ....................... H04L 67/12
(Continued)

FOREIGN PATENT DOCUMENTS

| CN | 108156418 | * | 6/2018 | |
| DE | 102015008768 A1 | * | 1/2017 | ............ G08G 1/205 |

(Continued)

OTHER PUBLICATIONS

Extended European Search Report issued in corresponding European Patent Application No. 20181891.1 dated Oct. 7, 2020, with English translation.

*Primary Examiner* — Muhammad Shafi
(74) *Attorney, Agent, or Firm* — Morgan, Lewis & Bockius LLP

(57) ABSTRACT

A method of operating a moving object on which a drone is mounted includes detecting, by the moving object, occurrence of an event; determining whether to use the drone, on the basis of the detected event; and determining an operation
(Continued)

mode, among a first operation mode and a second operation mode, of the drone when the drone is used.

18 Claims, 14 Drawing Sheets

(51) Int. Cl.
    *B60R 11/00*     (2006.01)
    *B60R 21/16*     (2006.01)
    *B60W 40/08*     (2012.01)
    *B64C 39/02*     (2006.01)
    *H04L 67/12*     (2022.01)

(52) U.S. Cl.
    CPC ........... *B64C 39/024* (2013.01); *G05D 1/005* (2013.01); *G05D 1/0022* (2013.01); *G05D 1/0027* (2013.01); *H04L 67/12* (2013.01); *H04W 4/42* (2018.02); *B60R 2011/004* (2013.01); *B60R 2011/0036* (2013.01); *B60W 2540/221* (2020.02); *B64C 2201/127* (2013.01)

(58) Field of Classification Search
    CPC ......... G05D 1/101; B60R 11/00; B60R 21/16; B60R 2011/0036; B60R 2011/004; B60W 40/08; B60W 2540/221; B60W 30/00; B64C 39/024; B64C 2201/127; B64C 39/00; H04L 67/12; H04W 4/42; G08G 1/012; G08G 1/0133; G08G 1/04; G06F 1/3228; G06F 3/01
    USPC .......................................................... 701/2
    See application file for complete search history.

(56) References Cited

U.S. PATENT DOCUMENTS

2018/0251234 A1*   9/2018   Wang ..................... B64F 1/222
2021/0192629 A1*   6/2021   Tofte ........................ H04N 5/44

FOREIGN PATENT DOCUMENTS

| WO | 2017/157863 A1 | | 9/2017 |
|----|----|----|----|
| WO | WO-2017157863 | * | 9/2017 |
| WO | 2018/009190 A1 | | 1/2018 |
| WO | 2018/045354 A2 | | 3/2018 |

* cited by examiner

FIG. 7A

| header | transmission type information | location information | data | end |

FIG. 7B

| header | moving object ID information | location information | data | end |

METHOD AND APPARATUS FOR USING DRONE IN MOVING OBJECT

CROSS REFERENCE TO RELATED APPLICATION

The present application claims priority to Korean Patent Application Nos. 10-2019-0075262, filed Jun. 24, 2019, the entire contents of which is incorporated herein for all purposes by this reference.

TECHNICAL FIELD

The present disclosure relates to a method and apparatus for using an unmanned aerial vehicle (UAV) or a drone in a moving object. In particular, the present disclosure relates to a method and apparatus for performing communication with another moving object or device using a drone in a moving object.

BACKGROUND

As technology progresses, a vehicle may communicate with other devices on the basis of various types of communication methods. In addition, as well as a vehicle, various devices are used for mobility, and methods for performing communication through these devices are being developed.

An unmanned aerial vehicle (UAV) or drone, which has been actively used not only in leisure but also in the military industry as one of the fourth industrial revolution technologies, is applicable to various industries such as construction, logistics, etc., thanks to the development of battery and communication technology as well as airplane technology. Recently, the application area of the drone has been continuously expanded through enlargement of traditional drones, as well as miniaturization thereof.

SUMMARY

The present disclosure may provide a method and apparatus for using a UAV or a drone in a moving object.

The present disclosure may provide a method and apparatus for utilizing a UAV or a drone in consideration of an emergency situation of a moving object.

The present disclosure may provide a method and apparatus for using a plurality of UAVs or drones in a moving object.

According to an embodiment, a method of operating a moving object on which a drone is mounted may be provided. The method includes detecting, by the moving object, occurrence of an event; determining whether to use the drone on the basis of the detected event; and determining an operation mode, among a first operation mode and a second operation mode, of the drone when the drone is used.

In addition, according to an embodiment, a moving object on which a drone is mounted may be provided. The moving object includes a transceiver configured to transmit and receive a signal; and a processor configured to control the transceiver. Herein, the processor may be configured to detect occurrence of an event, determine whether to use the drone on the basis of the detected event, and determine an operation mode, among a first operation mode and a second operation mode, of the drone when the drone is used.

The following can be applied in common to the moving object on which the drone is mounted and the method of operating the moving object on which the drone is mounted.

According to an embodiment, the drone may be configured to remain in a sleep state before the moving object detects the occurrence of the event; and the drone may be configured to, when the moving object detects the occurrence of the event, switch from the sleep state to an awake state.

In addition, according to an embodiment, the drone may be configured to, when the drone is switched to the awake state, start the flight and output at least one of an ultrasonic wave or an electromagnetic wave.

In addition, according to an embodiment, the moving object may be configured to, when an airbag installed in the moving body is operated, detect the occurrence of the event.

In addition, according to an embodiment, the moving object may be configured to, when a user input is detected for an emergency button installed on the moving object, detect the occurrence of the event.

In addition, according to an embodiment, the moving object may be configured to detect the occurrence of the event through at least one sensor installed on the moving object.

In addition, according to an embodiment, the drone may be configured to, when the moving object detects the event and then detects a user input via a human machine interface (HMI), operate on the basis of the first operation mode.

In addition, according to an embodiment, the drone may be configured to, when the moving object detects the event and then does not detect the user input via the HMI, operate on the basis of the second operation mode.

In addition, according to an embodiment, the moving object may be configured to obtain location information about the moving object; and in a case that the moving object is located in a first area predetermined on the basis of the location information, the drone may be configured to, when the event is detected, operate on the basis of the first operation mode.

In addition, according to an embodiment, in a case that the moving object is located in a second area predetermined on the basis of the location information, the drone may be configured to, when the event is detected, operate on the basis of the second operation mode.

In addition, according to an embodiment, in a case that the moving object is located in an area other than the first area predetermined on the basis of the location information, the drone may be configured to, when the event is detected, operate on the basis of the second operation mode.

In addition, according to an embodiment, the moving object may be configured to, when the operation mode of the drone is the first operation mode, transmit a message including the event related information in a broadcast manner using the drone to at least one moving object within a predetermined range from the moving object.

In addition, according to an embodiment, the message including the event related information may include location information of the moving object.

In addition, according to an embodiment, the message including the event related information may include transmission type information indicating the broadcast manner; and the moving object may be configured to transmit the message including the event related information to the at least one moving object within a predetermined range on the basis of a local area network without the base station.

In addition, according to an embodiment, the moving object may be configured to, when the operation mode of the drone is the second operation mode, transmit the message including the event related information to the base station in a unicast manner using the drone.

In addition, according to an embodiment, the message including the event related information may include at least one of moving object ID information, location information, or data.

In addition, according to an embodiment, the base station may provide the event related information to at least one moving object located within a predetermined distance from the moving object, on the basis of the moving object ID information and the location information of the message including the event related information.

In addition, according to an embodiment, the base station may provide the event related information to at least one of the server or a device associated with the moving object, on the basis of the moving object ID information and the location information of the message including the event related information.

In addition, according to an embodiment, the moving object may be equipped with one or more drones; the one or more drones may be configured to, when the moving object detects the event, switch to the awake state; and the one or more drones may be configured to perform operations different from each other.

In addition, according to an embodiment, a first drone of the one or more drones may acquire image information on the moving object through the flight turning around the moving object; and a second drone of the one or more drones may communicate with at least one of the moving object, another moving object, a device, or a base station, and exchange information about the event.

According to the present disclosure, it is possible to use a UAV or a drone in a moving object.

According to the present disclosure, it is possible to utilize a UAV or a drone in consideration of an emergency situation of a moving object.

According to the present disclosure, it is possible to use a plurality of UAVs or drones in a moving object.

Technical problems to be achieved in the present disclosure are not limited to the above-mentioned technical problems, and other technical problems not mentioned above will be clearly understood by those skilled in the art from the following description.

BRIEF DESCRIPTION OF THE DRAWINGS

The above and other objects, features, and other advantages of the present disclosure will be more clearly understood from the following detailed description when taken in conjunction with the accompanying drawings, in which:

FIGS. 7A and 7B are diagrams illustrating a format for a message transmitted by a drone;

DETAILED DESCRIPTION

Figure 1:
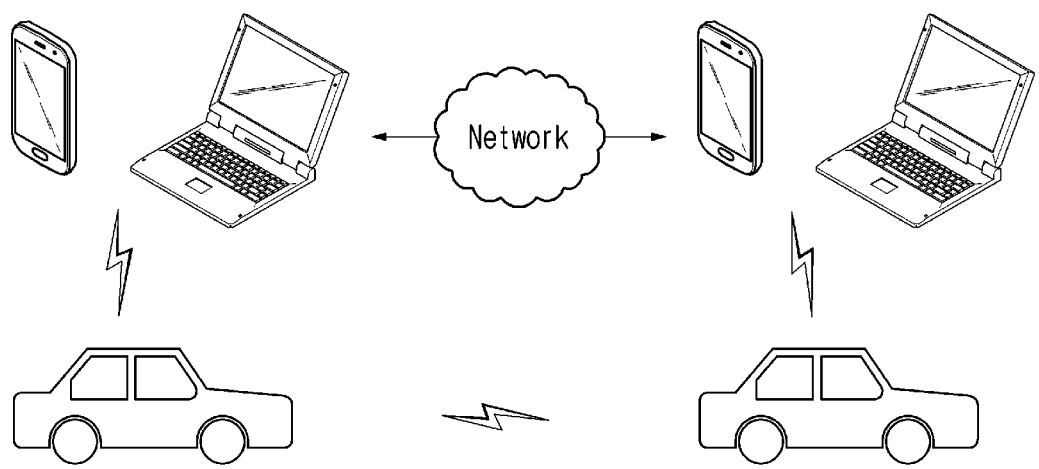
FIG. 1 is a diagram illustrating a method in which a moving object communicates with other devices.

Hereinafter, embodiments of the present disclosure will be described in detail so that those skilled in the art can easily carry out the present invention referring to the accompanying drawings. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and similar parts are denoted by similar reference numerals.

In the present disclosure, when a component is "connected", "coupled", or "fixed" to another component, it means that the component is not only directly connected to the another component, but also the component is indirectly connected to the another component with other components in between. In addition, when a component "includes" or "has" another component, it means that the component may further include another component without excluding other components, unless specifically stated otherwise.

In the present disclosure, terms such as first and second are used only for the purpose of distinguishing one component from other components, and do not limit the order or importance between the components unless specifically mentioned. Accordingly, within the scope of the present disclosure, a first component in one embodiment may be referred to as a second component in another embodiment, and likewise, a second component in one embodiment may be referred to as a first component in another embodiment.

In the present disclosure, the components distinguished from each other are for clearly describing each feature, and do not necessarily mean that the components are separated. That is, a plurality of components may be integrated into one hardware or software unit, or one component may be distributed and formed into a plurality of hardware or software units. Therefore, even if not mentioned otherwise, such integrated or distributed embodiments are included in the scope of the present disclosure.

In the present disclosure, components described in various embodiments do not necessarily mean essential components, and some of them may be optional components. Therefore, an embodiment composed of a subset of components described in an embodiment is also included in the scope of the present disclosure. In addition, embodiments including other components in addition to the components described in the various embodiments are included in the scope of the present disclosure.

Advantages and features of the present disclosure, and methods for achieving them will be apparent with reference to the embodiments described below in detail with reference to the accompanying drawings. However, the present disclosure is not limited to the embodiments set forth below, but may be implemented in various forms, and only the present embodiments are provided to make the spirit of the present disclosure complete, and to fully inform those of ordinary skill in the art of the scope of the disclosure.

FIG. 1 is a diagram illustrating a method in which a moving object communicates with other moving objects or devices through a network. Referring to FIG. 1, a moving object may communicate with other moving object or other device. Herein, as an example, the moving object may communicate with other moving object or other device, based on cellular communication, WAVE communication, dedicated short range communication (DSRC), or another communication scheme. That is, as the cellular communication network, a communication network such as LTE, 5G, Wi-Fi communication network, WAVE communication network, etc. may be used. In addition, a local area network used in a moving object such as DSRC may be used, but the present disclosure is not limited thereto.

In addition, for example, with respect to the communication of a moving object, a module capable of communication with only a device located inside the moving object and a module capable of communication with a device outside the moving object may be separated from each other for the security of the moving object. For example, inside a moving object, communication may be performed on the basis of security only for a device within a certain range of the moving object, such as Wi-Fi communication. For example, a moving object and a moving object driver's personal device may include a communication module for performing only communication with each other. That is, the moving object and the moving object driver's personal device may use a communication network that is blocked from an external communication network. Also, as an example, the moving object may include a communication module for performing communication with an external device. As another example, the above-described module may be implemented as one module. That is, the moving object may communicate with another device on the basis of one module, but the present disclosure is not limited thereto. That is, the communication method may be implemented in the moving object on the basis of various methods, but the present disclosure is not limited thereto.

Herein, as an example, the moving object may refer to a device capable of moving. For example, the moving object includes a vehicle (such as an autonomous vehicle or an automated vehicle), a drone, mobility, a mobile office, a mobile hotel, or a personal air vehicle (PAV). In addition, the moving object may be another moving device, but the present disclosure is not limited thereto.

Figure 2:
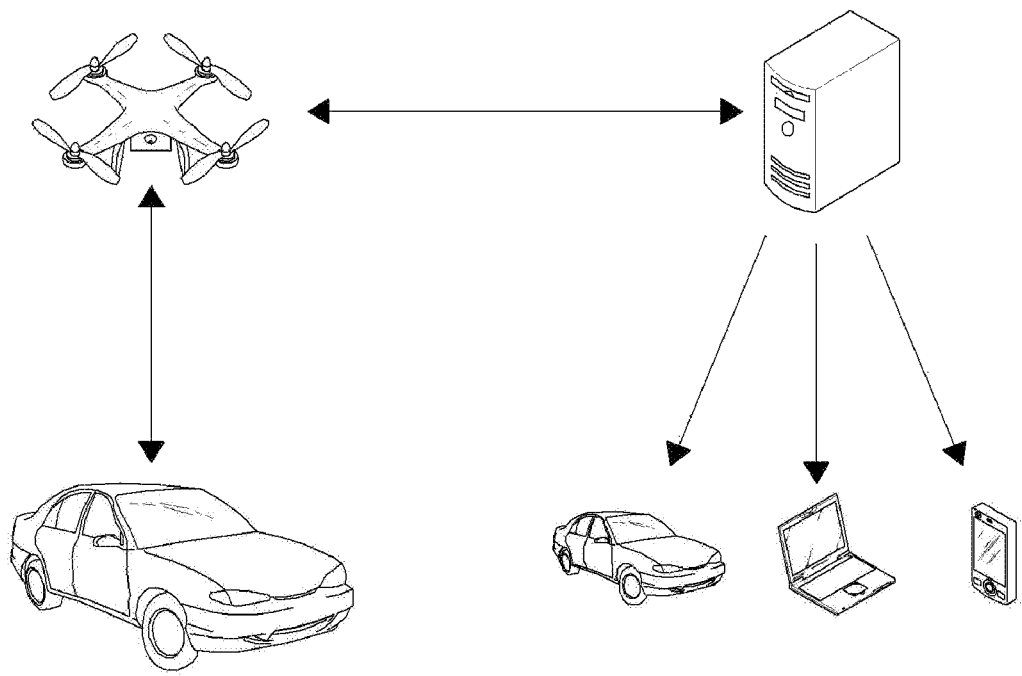
FIG. 2 is a diagram illustrating a method of awakening a drone in a moving object equipped with a drone.

FIG. 2 is a diagram illustrating a method in which a drone (or UAV) is mounted on a moving object to be used.

Referring to FIG. 2, a drone may be mounted on a moving object. Herein, the drone may mean an object capable of flying. For example, the drone may be referred to as a UAV or the like, but is not limited thereto. That is, the drone may refer to a device capable of flying and communicating with another device. However, hereinafter, it is referred to as a drone for convenience of description, but the present disclosure is not limited thereto.

For example, referring to FIG. 2, a drone may be mounted on a moving object. Herein, the moving object may be equipped with a plurality of drones. In addition, the state in which the drone is mounted on the moving object may vary, which will be described later. Herein, as an example, when an emergency situation of the moving object occurs, the drone may be separated from the moving object to communicate with another device. As an example, the drone may communicate with servers for emergency rescue. For example, the server may be a server associated with accident processing of a moving object. In addition, the server may be a server associated with traffic conditions. As another example, the server may be any other server and is not limited to the above-described embodiment. That is, the drone may be separated from the moving object in an emergency situation to communicate with other devices and transmit necessary information to the server. Meanwhile, the server may transmit information received from the drone to another moving object, a smartphone, or other device, which will be described later.

FIGS. 3A to 4B are diagrams illustrating a method of mounting a drone on a moving object.

A drone may be mounted on a moving object. Herein, the drone may be mounted inside the moving object to be invisible from the outside.

For example, the drone may be mounted at the topmost inside the moving object. As a specific example, the drone of a sunroof type may be installed in a predetermined space inside the moving object. Herein, when an abnormality occurs in the moving object or an emergency situation is recognized, a door of a sunroof type is opened in the moving object, and the drone is separated at a point in which the door is opened so that the drone may start the flight. As another example, a drone may be installed in an item storage area or other storage area in a moving object. As a specific example, the drone may be mounted in a predetermined space of the trunk or boot of the moving object. Herein, when an abnormality occurs in the moving object or when an emergency situation is recognized, the trunk may be opened from the moving object, and the drone may be separated to start the flight.

Figure 3A:
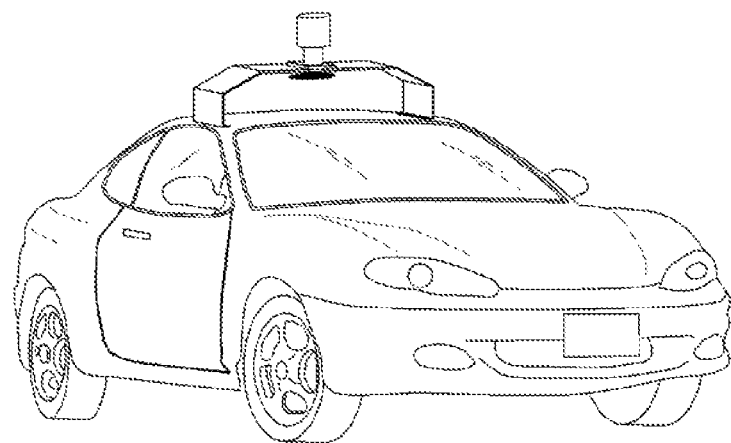
FIGS. 3A and 3B are diagrams illustrating how a drone is mounted on a moving object.
Figure 3B:
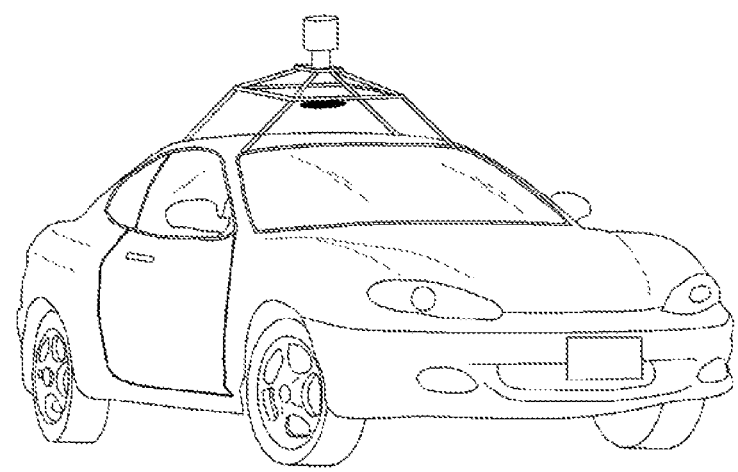

In addition, referring to FIGS. 3A and 3B, an upper structure considering a radar may be mounted on a moving object. For example, as shown in FIG. 3A or 3B, the upper structure may be mounted on the top of the moving object. For example, the moving object may be equipped with an antenna structure for communicating with other devices. Also, as an example, a radar structure for sensing may be mounted on the moving object. In addition, as an example, an upper structure for another purpose may be mounted on the moving object, but the present disclosure is not limited thereto. Herein, as an example, the drone may be mounted on the bottom of the upper structure. Also, as an example, the drone may be mounted on other parts of the upper structure. That is, the drone may be mounted on the upper structure mounted on the moving object as described above. The present disclosure is not limited to the examples shown in FIGS. 3A and 3B, and the upper structure may be of another type.

Figure 4A:
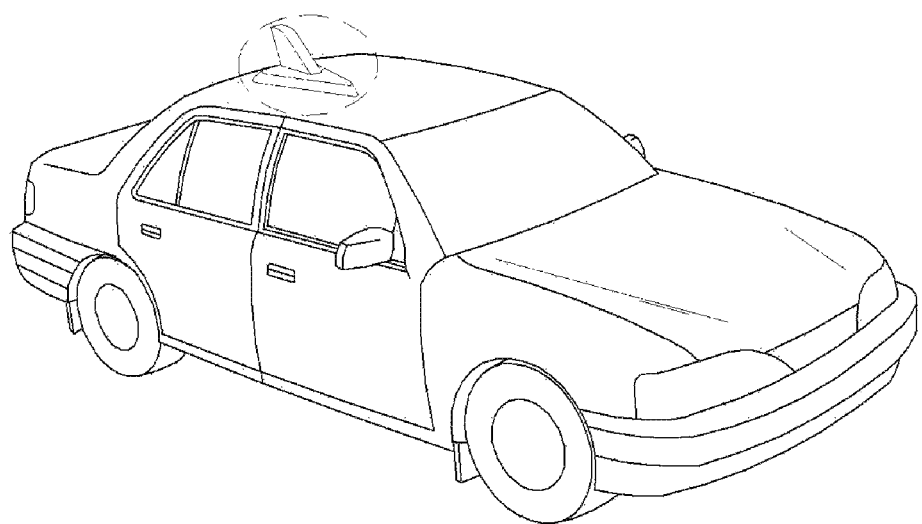
FIGS. 4A and 4B are diagrams illustrating how the drone is mounted on the moving object.
Figure 4B:
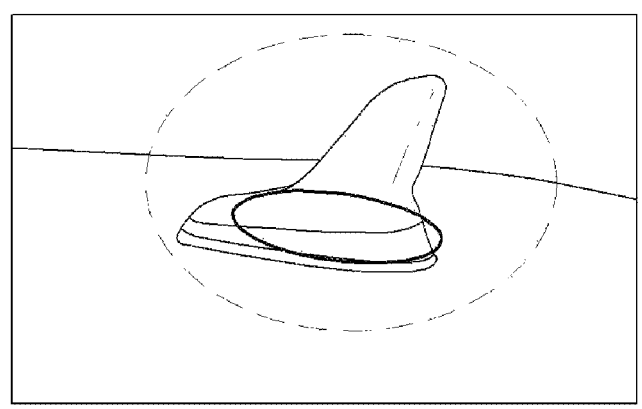

As another example, referring to FIGS. 4A and 4B, a structure for an antenna may be mounted on a moving object. Herein, as an example, referring to FIG. 4A, the structure for the antenna of the moving object may be smaller than that of the upper structure of FIG. 3A or 3B and may be installed in the moving object. Herein, as an example, referring to FIG. 4B, a drone may be mounted on a structure for an antenna of a moving object. Herein, the structure for the antenna of the moving object may be configured with a larger size compared to the existing structure so that the drone may be mounted. That is, the structure for the antenna of the moving object may play a role as an antenna for transmitting and receiving a signal, as well as perform a function of mounting a drone. Meanwhile, for example, when the size of a structure for an antenna of a moving object is increased, the signal reception performance of the moving object may be improved. That is, the drone may be mounted with the size of the antenna structure being increased so that the moving object may communicate with other devices, but the present disclosure is limited thereto.

In addition, as an example, FIGS. 4A and 4B show only an example in which the antenna structure is mounted, and the antenna may be also mounted in other forms.

Meanwhile, as a specific example, the drone remains in a sleep state in which the drone is mounted on a moving object, and the drone may be switched to an awake state to start a flight when the drone is separated from the moving object. More specifically, when the drone is used in an emergency situation, the drone may remain in a sleep state in a normal situation. In other words, the power is prevented from supplied to the drone in a situation where an accident does not occur, thereby preventing the drone from consuming unnecessary power. Herein, as an example, when an abnormality occurs or the emergency situation is determined in the moving object, the moving object may switch the drone to an awake state. For example, the moving object may determine whether there is an emergency situation. Herein, the moving object may determine whether there is an emergency situation on the basis of whether the moving object is damaged, whether the moving object is malfunctioning, whether the moving object is fired, the internal temperature of the moving object, and other information related to the moving object. As a more specific example, the moving object may determine that an emergency situation occurs and awake the drone when an airbag is deployed. That is, it is possible to awake the drone at a time point when the airbag is deployed in association with the airbag. As another example, the moving object may determine an input for an emergency button (e.g., ecall) from the user. That is, the user may press the emergency button in the emergency situation. Herein, when the moving object determine an input for the emergency button, the moving object may switch the drone to an awake state.

As another example, the moving object may include a plurality of sensors for determining whether there is an abnormality as described above. Herein, the moving object may determine whether the moving object is abnormal on the basis of information collected from the plurality of sensors, and determine whether the abnormality of the moving object is equal to or higher than a predetermined level. For example, when an abnormality does not occur in the moving object, the drone may remain in a sleep state. Herein, when the abnormality of the moving object is equal to or higher than the predetermined level, the drone may be switched to the awake state. In other words, the moving object may supply power to the drone and switch the drone to a state capable of flying. As a more specific example, it is possible to awake the drone according to other sensors (e.g. gravity acceleration sensors) mounted on the moving object. Herein, the moving object may awake the drone when the gravity acceleration value of the sensor mounted on the moving object is equal to or higher than a predetermined value. Herein, the moving object may awake the drone, when the gravitational acceleration value is equal to or greater than a predetermined value, i.e., when the moving object does not receive a response from a driver by a Human Machine Interface (HMI). In other words, the moving object may awake the drone when an emergency is recognized.

As another example, a case in which the driver does not directly transmit an event occurrence at the time of an emergency situation of a moving object may be considered. In addition, for example, sensors included in the moving object may not operate properly when the moving object is damaged and may not detect the event. In view of the foregoing, the event may be detected through an external organization (e.g., rescue organization, 119, etc.) or an application of the device. More specifically, although an event occurs in the moving object, the moving object itself or the driver may not detect the event. Herein, for example, the event may be detected externally, and the occurrence of the event may be detected on the basis of information from an organization related to the event. That is, an event occurring in a moving object may be detected by an external organization to be engaged, and a drone may be awakened when the event is detected. As another example, an event may be detected through an application of a device of a driver or another user. As described above, the event may be detected through the device of the driver or another user in the case that the event may not be detected by the moving object itself or by the driver. Herein, when the event is detected through the device, the drone receiving the event related signal from the device may be awakened. That is, the event may be detected on the basis of at least one of a moving object inside, a driver input, an external organization, or an external device, but the present disclosure is not limited thereto. Herein, when the event is detected, the drone may be awakened, which was described above.

In addition, as an example, when the drone is switched to the awake state to start the flight, the drone may start the flight on the basis of the predetermined driving information. For example, the driving information may be set so that the drone has an altitude perpendicular to the moving object as driving information predetermined in the drone. In addition, as an example, the drive information may be set so that the drone acquires an image around the moving object through the flight within a predetermined distance from the moving object. In addition, as an example, the drone may maintain the stationary flight state while maintaining a predetermined distance from the moving object, but the present disclosure is not limited thereto. Based on the foregoing, the drone may operate separately from the moving object. Herein, for example, when a drone is separated from a moving object, the drone may perform communication with another device, which will be described later.

As another example, in the above-described case, the drone may autonomously perform a flight on the basis of the predetermined driving information. Meanwhile, as another example, when the moving object recognizes an emergency situation, the moving object may switch the drone to an awake state and provide a control right for the drone to the registered device. Herein, the registered device may be a device associated with a moving object or a device of a moving object driver, but the present disclosure is not limited thereto. Herein, the registered device may control the awakened drone, and communicate with other devices or acquire the surrounding image through the drone control.

More specifically, when the drone remain in a sleep state, the drone may not communicate with a moving object or another device in consideration of power consumption. As another example, when the drone remains in a sleep state, the drone may exchange a simple message with the moving object or another device in consideration of a long period. Through this, the moving object or another device may determine whether the drone is abnormal. In addition, since the information about the drone is transmitted to the moving object or another device in consideration of a long period, it is possible to prevent power consumption by the drone. Meanwhile, when the drone is switched to an awake state, the drone may communicate with at least one of a moving object and another device. That is, the drone may be switched to a state in which communication is possible.

Accordingly, the drone may exchange necessary information with at least one of other devices, organizations, and moving objects.

As another example, the drone may be switched from the awake state back to the sleep state. As a specific example, the moving object may switch the drone to the sleep state when determining a user input for switching the drone to the sleep state. For example, the user input comprises a touch input or an input for a predetermined button. In addition, as an example, the drone may be switched to a sleep state when the drone is engaged with an organization (or a rescue organization) to receive a message about the end of the flight from the organization. More specifically, the drone may provide information associated with the event to the organization or other device on the basis of the event. Herein, the organization or another device may receive information related to the event from the drone, and when the confirmation of the information about the event occurring in the moving object is completed and no further information is needed, the drone may receive a message about the end of the flight. Herein, when the drone receives the above-mentioned message, the drone may terminate the flight and be switched to a sleep state. As another example, when the control authority of the drone is switched to an external device of the moving object, the drone may receive a flight termination command from the external device and be switched to a sleep state on the basis of the command, but the present disclosure is not limited thereto.

Figure 5:
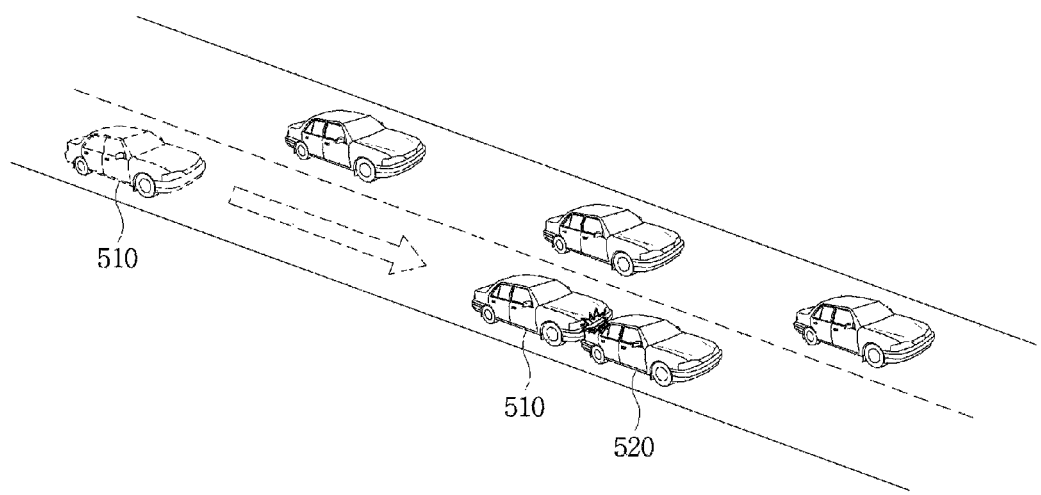
FIG. 5 is a diagram illustrating a situation in which an emergency situation of a moving object occurs.

FIG. 5 is a diagram illustrating a case where an emergency situation of a moving object occurs.

As described above, when the moving object determines an emergency situation, the drone may be awakened to operate. Herein, for example, when the moving object determines an emergency situation, there may be various forms. More specifically, the drone may operate separately from the moving object when an emergency situation of the moving object occurs. Therefore, when the moving object determines an emergency situation through incorrect information due to a malfunction, the drone may be unnecessarily separated from the moving object and operate, thereby causing a problem. In consideration of the foregoing, it may be necessary to distinguish a case where the moving object determines an emergency situation.

For example, the moving object may determine an emergency situation by a sensor that has already mounted. As a specific example, the moving object may determine an emergency situation when the airbag operates inside the moving object. That is, when the moving object detects that the airbag is deployed, the moving object may determine an emergency situation and switch the drone to an awake state. In addition, as an example, when the moving object detects that a fire occurs in the moving object using a temperature sensor, the moving object may determine an emergency situation and switch the drone to an awake state.

As another example, the drone may be switched to an awake state by a moving object user. As an example, the battery of the moving object may be discharged or a problem may occur in driving of the moving object due to a malfunction. Herein, the moving object is required to operate using the drone, which may be not determined as an emergency situation. Based on the foregoing, the moving object may determine an input for the drone awake from the user of the moving object, and switch the drone to an awake state to operate the drone on the basis of the input.

As another example, the moving object may include a plurality of sensors for recognizing an emergency situation. Herein, the moving object may predetermine a plurality of values for recognizing the emergency situation and determine the emergency situation on the basis of the predetermined values. In addition, as an example, the emergency situation may be an event. When a special event occurs in the moving object, the drone may operate separately from the moving object, but the present disclosure is not limited thereto.

As a specific example, referring to FIG. 5, when a moving object 510 collides with another moving object 520 while moving, the drone may be switched to an awake state to be operated. For example, when a collision of the moving object 510 occurs, the airbag of the moving object 510 may be deployed, and the drone may be switched to an awake state on the basis of the same. As another example, the moving object 510 may include a collision detection sensor, and when a collision at a level equal to or higher than a predetermined level is detected by the sensor in the moving object 510, the drone may be awakened as described above. That is, the drone may be switched to an awake state to be operated on the basis of a predetermined condition in the moving object 510, and the predetermined condition is not limited to the above.

FIG. 6 is a diagram illustrating a drone operation in an operation mode.

As described above, when the drone is switched to an awake state, the drone may be operated separately from the moving object. Herein, the drone may start the flight and communicate with other devices. For example, the flight of the drone and the communication of the drone may be set differently according to the operation mode. However, as an example, when the drone is operated separately from the moving object, the drone may detect the surrounding objects in consideration of flight. For example, when another vehicle (e.g. helicopter, another drone) that affects flight of the drone is flying around a moving object, the drone may not switch from an awake state back to a sleep state without starting the flight. For example, the drone may detect whether another vehicle exists and determine a collision possibility for the purpose of for flight. Herein, when it is determined that the drone has a low possibility of collision and is capable of flying, the drone may remain in an awake state to perform the flight. Meanwhile, when it is determined that the drone has a high possibility of collision and is not capable of flying, the drone may switch from an awake state to a sleep state not to perform the flight. Herein, for example, the operation to be performed in the drone may be performed through the aircraft that has already flight, but the present disclosure is not limited thereto.

In a more specific example in which the drone performs a flight, when an accident occurs on the moving object, the drone may operate differently depending on the importance of the accident. As a specific example, when the moving object causes a simple collision or an accident so as to disturb traffic, the moving object may not communicate with an emergency situation server or organizations associated with the emergency situation. For example, when all information on a moving object accident is transmitted to an emergency situation server or organizations associated with an emergency situation, the emergency situation server or emergency situation organization may obtain a plurality of pieces of accident information. However, the emergency situation server or emergency situation organization may also receive information that does not substantially require additional measures, and unnecessary operations may be performed according to the same. In view of the foregoing, the drone may operate differently according to the operation mode.

However, for example, when a drone is switched to an awake state regardless of an operation mode of the drone, the drone is required to inform surrounding moving objects or devices of its existence. To this end, when the drone is awakened, the drone may provide output information. Herein, the output information may include at least one of sound and light. More specifically, when the drone is switched to an awake state, it is possible to generate ultrasonic waves, infrared light, or visible light for communication. That is, the drone may provide an alarm that notifies surrounding moving objects and devices of drone's awake state. In addition, for example, when the drone is switched to an awake state, it is possible to generate light. In other words, when the drone is switched to an awake state, it is possible to generate electromagnetic waves. For example, the drone may further include a light emitting unit, and light (or electromagnetic waves) may be generated through the light emitting unit when the drone is awakened. Accordingly, the surrounding moving objects or other devices may easily recognize that the drone is awakened, and processing on the emergency situation may be performed on the basis of the foregoing. In addition, as an example, when the drone is awakened, the drone may further activate other functions, but the present disclosure is not limited thereto.

However, as an example, the drone may operate in different operation modes according to the emergency situation as described above. For example, referring to FIG. 6A, when the drone 620 operates in a first operation mode, the drone 620 may perform only flight vertical with respect to the moving object 610. In addition, the drone 620 may transmit a broadcast message to a predetermined area around the moving object 610 without directly communicating with the base station or the server. Herein, the broadcast message may include at least one pieces of information of information indicating that the transmission type is a broadcast type, information indicating that an accident occurs in the moving object, an accident occurrence point of the moving object, and accident related information. Herein, moving objects located within a predetermined distance from the moving object 610 around the moving object 610 may receive the broadcast message without a base station or a server. Through this, the surrounding moving objects may confirm that an accident has occurred or the traffic condition is not good at a certain point, and thus may bypass the route or perform other actions. Herein, the drone 620 transmits only relevant information to neighboring moving objects located within a predetermined distance using the broadcast message, not through a base station or a server, so that transmission overhead may be small and simple information may be transmitted. Based on the foregoing, the first operation mode may be an operation mode in a case in which a human injury does not occur and a shock or the like occurs in the moving object. For example, when the moving object detects that an emergency situation occurs as described above, the moving object may determine the level of the emergency situation. For example, the level of the emergency situation may be determined on the basis of at least one of an image sensor inside the moving object, whether the moving object is damaged, or whether there is a fire. That is, in case of a minor accident, the drone may be operated in the first operation mode. Accordingly, when an accident occurs on a moving object, the moving object may notify the surrounding moving objects of the location of the moving object, and a plurality of moving objects may perform transmission without transmission overhead through the broadcast method. Herein, the broadcast message includes the location information of the moving object and information indicating whether there is an accident. The message size may be small and the message may be easily transmitted to a plurality of moving objects. Herein, for example, a drone may use various types of communication networks to transmit broadcast messages, but the present disclosure is not limited thereto.

Figure 6A:
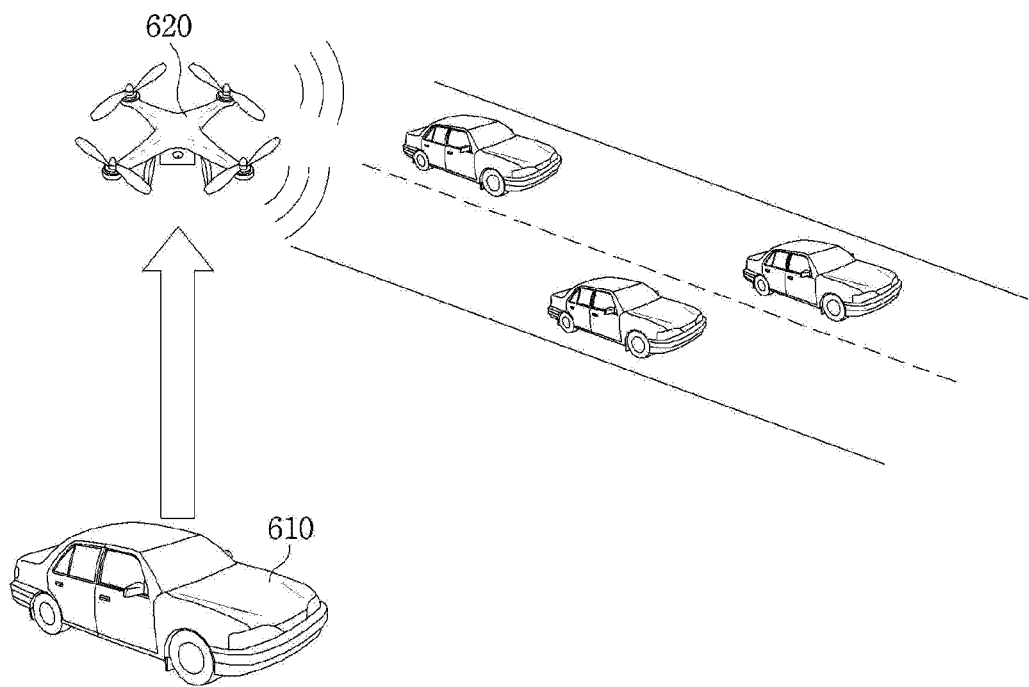
FIGS. 6A-6D are diagrams illustrating a method in which a moving object operates on the basis of a first operation mode and a second operation mode.
Figure 6B:
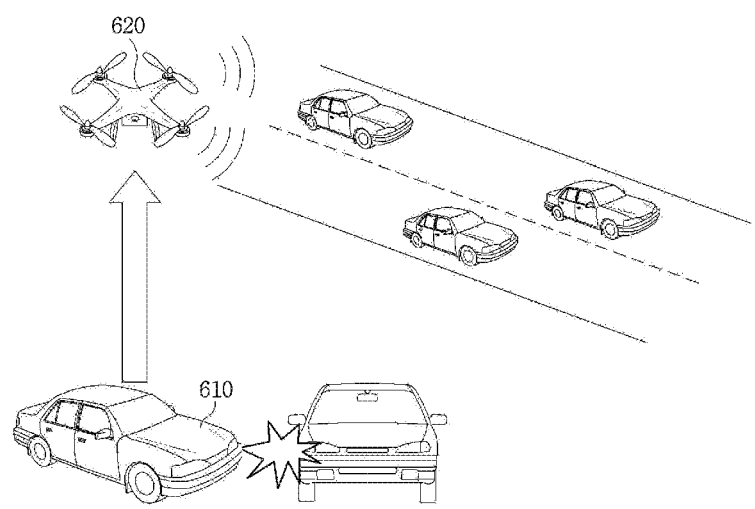

Herein, as a specific example, referring to FIG. 6B, an event in which the moving object 610 collides with another moving object may be considered. Herein, when the moving object 610 detects an event and operates in the first operation mode as described above, the drone 620 may be awakened in the moving object 610. Herein, for example, the drone 620 awakened from the moving object 610 may provide collision related information to surrounding moving objects. Herein, for example, the drone 620 may include accident related information in the broadcast message and provide the same to surrounding moving objects. Herein, as a specific example, the collision related information may be transmitted to at least one of a moving object and a device located within a predetermined distance with respect to the moving object 610. As another example, the surrounding moving objects are continuously moving, and the drone 620 may transmit a message to the moving object entering within a predetermined distance. That is, the drone 620 transmits, as the broadcast message, collision related information to the moving objects and devices located within a predetermined distance when an event (collision) occurs, and then checks the moving objects and devices entering within the predetermined distance so that message may be further transmitted to the same. That is, the drone 620 may transmit event related information to at least one of the surrounding moving objects and devices through the broadcast message in the first operation mode.

Figure 6C:
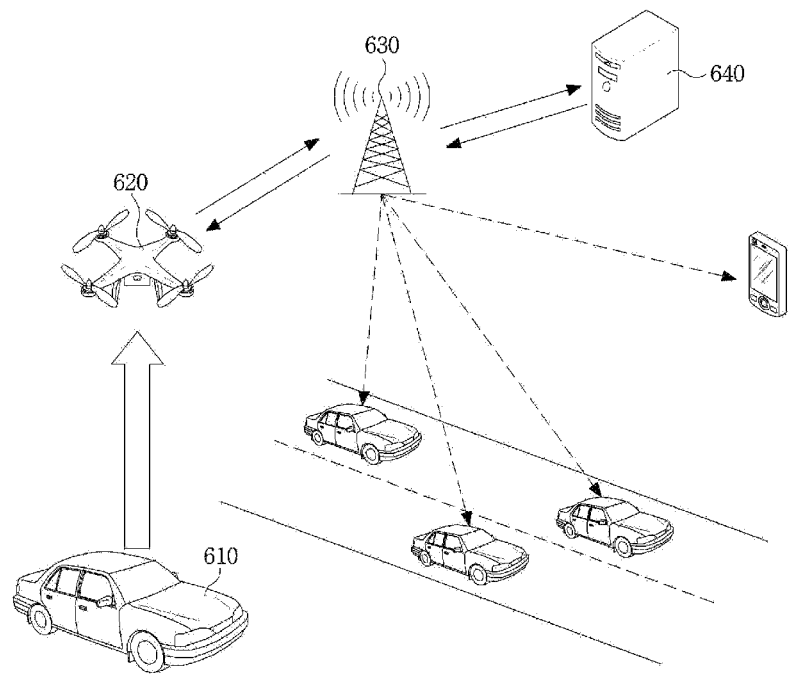

Meanwhile, referring to FIG. 6C, when the drone 620 operates in a second operation mode, the drone 620 may rotate while photographing an image around the moving object 610. In addition, the drone 620 may communicate with the base station, and thus directly communicate with an emergency situation server or an emergency situation organization. Herein, the drone 620 may further include information indicating the emergency situation of the moving object 610 and location information of the moving object 610, as well as black box image information of the moving object 610 or surrounding image information and transmit the same to an emergency situation server or an emergency situation organization. As a specific example, when the drone 620 operates in the second operation mode, the drone 620 may obtain emergency situation related image information while turning around the moving object 610 as described above. In addition, as an example, the drone 620 may communicate with the moving object 610 and acquire an internal image stored in the black box of the moving object 610. In addition, the drone 620 may obtain necessary information from the peripheral device (e.g. RSU) or other moving objects, and transmit the information to the emergency situation server or organization through the base station.

That is, when the drone operates in the second operation mode, the drone may exchange a message including a plurality of pieces of information with the base station via a unicast method. Accordingly, the drone may transmit a large number of messages to the server, and the moving object user may perform a specific response to the emergency situation. Meanwhile, for example, the base station may transmit a message received through the drone to server and other devices, but the present disclosure is not limited thereto.

Based on the above description, the second operation mode may be an operation mode in the case that a human injury occurs or an impact occurs in the moving object. For example, when the moving object detects that an emergency situation occurs as described above, the moving object may determine the level of the emergency situation. For example, the level of the emergency situation may be determined on the basis of at least one of an image sensor inside the moving object, whether a moving object is damaged, or whether there is a fire. That is, the second operation mode may be an operation mode in the case that it is determined that the emergency situation is urgent so that the moving object is required to perform a specific action with the emergency situation server or organization. To this end, the drone may use a wireless mobile communication network to perform a large amount of data transmission, and may perform specific accident processing.

For example, as described above, the second operation mode may be an operation mode considering an emergency situation. Herein, considering an emergency situation, the driver may not be able to communicate the event (or accident) occurrence to the rescue organization (e.g. 911) directly. In addition, for example, it may not be possible to detect an event due to damage of a sensor inside a moving object. In view of the foregoing, the drone may operate in engagement with an organization (or rescue organization). As another example, the drone may be engaged with the driver's device in the second operation mode. For example, an application related to a drone of a moving object may be installed in the driver device. Herein, when the drone is awakened on the basis of above-described second operation mode as the emergency situation, the drone may be engaged with the driver's device to provide information about the event. That is, when the event occurs in the moving object, the drone may be predetermined to be engaged with the driver device considering the case where the information may not be transmitted due to the damage of the moving object.

In addition, as an example, as described above, in consideration of the fact that a driver is not directly capable of delivering an event in an emergency situation, the drone may operate to be directly engaged with the organization in the second operation mode, thereby efficiently responding to the event.

Figure 6D:
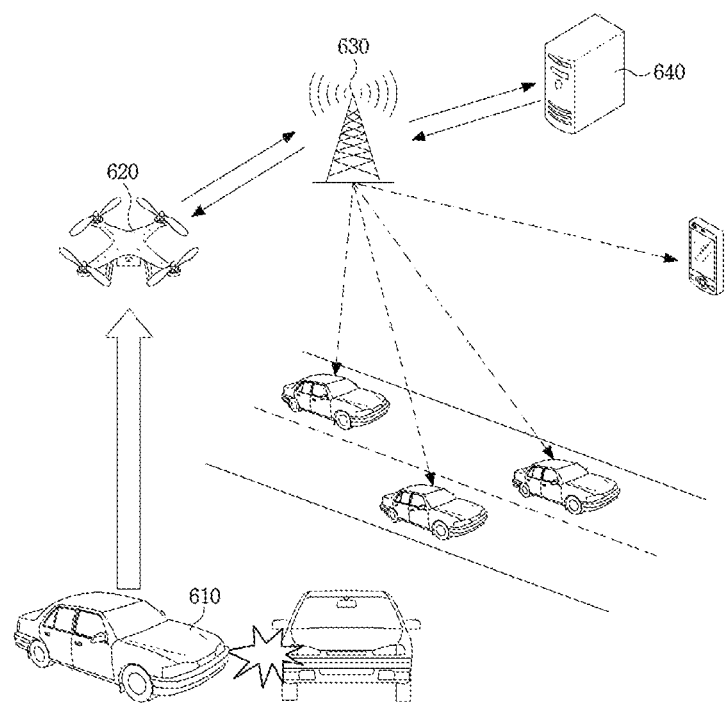

Herein, as a specific example, referring to FIG. 6D, an event in which the moving object 610 collides with another moving object may be considered. Herein, when the moving object 610 detects an event and operates in the second operation mode as described above, the drone 620 may be awakened in the moving object 610. Herein, for example, the drone 620 awakened in the moving object 610 may communicate with the base station and provide collision related information. Herein, for example, unlike FIG. 6B, collision related information may be provided to at least one of a moving object and a device located within a predetermined distance from the moving object 610 through a base station. For example, the base station may check the location information of the moving object 610, check moving objects and devices within a predetermined distance on the basis of location information of the moving object 610, and transmit an event (collision) related message. As another example, since neighboring moving objects continuously move, the base station may transmit a message to moving objects entering within a predetermined distance from the moving object. That is, the base station transmits, as a message, collision related information to a moving object and devices located within a predetermined distance when an event (collision) occurs, and then checks the moving objects and devices entering within a predetermined distance to additionally transmit the message to the same.

As another example, when an emergency situation occurs in the moving object, the moving object may determine the operation mode of the drone. For example, when an emergency situation occurs in the moving object, the moving object may determine whether the driver reacts through the HMI. Herein, when the moving object detects that the driver reacts through the HMI, the drone may operate on the basis of the first operation mode. That is, the moving object may determine that the event is a minor accident when the driver reacts through the HMI to be operated in the first operation mode. In addition, as an example, when the moving object detects that the driver does not react through the HMI, the drone may operate on the basis of the second operation mode. That is, the moving object may activate the drone on the basis of the second operation mode when the accident is serious enough that the driver may not react through the HMI, thereby enabling quick responses to the emergency situations.

Herein, for example, the HMI may refer to an interface through which a moving object can recognize a driver. In more detail, the moving object may recognize the gesture of the driver through the HMI. In addition, as an example, the moving object may receive touch input or button input information received from the driver through the HMI. As another example, the moving object may check biometric information about the driver through the HMI. For example, the moving object may check biometric information related to EEG, respiration, pulse, and heart rate of the driver. That is, the HMI may refer to an interface for recognition between the moving object and the driver, but the present disclosure is not limited thereto. Herein, for example, the moving object may detect the driver's response through the HMI, and determine the operation mode on the basis of the foregoing, which was as described above.

As another example, the operation mode of the drone may be determined according to a road on which a moving object is driving or a traffic situation. More specifically, when an emergency situation occurs while the moving object is driving in the city center or at a low speed, the drone may operate on the basis of the first operation mode. For example, the user may cope with an emergency situation occurring when driving in a city center or at a low speed. Therefore, the moving object may operate the drone on the basis of the first operation mode when an emergency situation occurs while driving in a city center or at a low speed. As a specific example, the moving object may determine whether the moving object is located in the city center by checking the location information and the map information of the moving object. For example, the city center may be predetermined as a predetermined area in the map information, but the present disclosure is not limited thereto. In addition, as an example, the moving object may check the speed of the moving object when an emergency situation occurs. Herein, when the moving speed of the moving object is less than the predetermined speed, the moving object may operate the drone on the basis of the first operation mode. Meanwhile, when the moving object is not the city center or the moving object is driving at a high speed such as in an automobile road or a highway, the moving object may operate the drone on the basis of the second operation mode. As a specific example, the moving object may determine whether the moving object is located in the city center by checking the location information and the map information of the moving object. For example, the city center may be predetermined as a predetermined area in the map information, but the present disclosure is not limited thereto. Herein, when the moving object is not located in the predetermined area, it may be determined that the moving object is not driving in the city center. As another example, when the moving object is located in an area outside the city center which is the predetermined area, it may be determined that the moving object is not driving in the city center. For example, when an emergency situation of the moving object occurs at a non-city area, the moving object user needs to directly contact a server or an organization associated with an emergency situation. Therefore, in consideration of the foregoing, the moving object may operate the drone on the basis of the second operation mode. Also, as an example, the moving object may check the speed of the moving object when an emergency situation occurs. Herein, when the moving speed of the moving object is greater than the predetermined speed, the moving object may operate the drone on the basis of the second operation mode. That is, when an emergency situation occurs while the moving object is driving at a high speed, there is high probability of occurrence of the emergency situation, so that the drone may operate on the basis of the first operation mode.

In addition, as an example, the first operation mode and the second operation mode may be set on the basis of other methods, and are not limited to the above-described embodiment.

FIGS. 7A and 7B are diagrams illustrating a data format used when a drone performs data transfer.

For example, referring to FIG. 7A, when the drone operates in the first operation mode, the drone may transmit data on the basis of a first type format. Herein, the first type format may include at least one of a header, transport type information, location information, and other data. For example, the first type format may be a message of a small size. More specifically, the first type format may include a header including control information related to a message. In addition, the first type format may include transport type information to indicate that a simple message is transmitted to neighboring moving objects on the basis of the broadcast type. In addition, the first type format may include information for indicating a location of a moving object. In addition, the first type format may further include other necessary information, and is not limited to the above-described embodiment.

Herein, for example, as described above, the first type format may be a message of a small size and may be transmitted to a plurality of moving objects through a broadcast method.

For example, referring to FIG. 7B, when the drone operates in the second operation mode, the drone may transmit a message on the basis of the second type format. Herein, the second type format may include at least one of a header, moving object ID information, location information, and data. Herein, the header may include control information required for message transmission. In addition, the second type format may include moving object ID information. Herein, for example, when a drone transmits a message of a small size through broadcast transmission on the basis of a first operation mode, moving objects that receive the same do not need to check the ID of the moving object. That is, other moving objects may check only information on the accident point and whether there is an accident.

Meanwhile, when the drone operates in the second mode of operation, the drone needs to send specific information about the moving object to the emergency situation server or organization. Herein, there is a need to identify the moving object, the second type format may further include moving object ID information. In addition, the second type format information may include location information of the moving object. In addition, the second type format may include moving object surrounding image information, moving object black box image information, and other information as data information, as described above. That is, the second type format may transmit a message of a large size as specific information to the server through the base station in a unicast manner, as described above.

Figure 8:
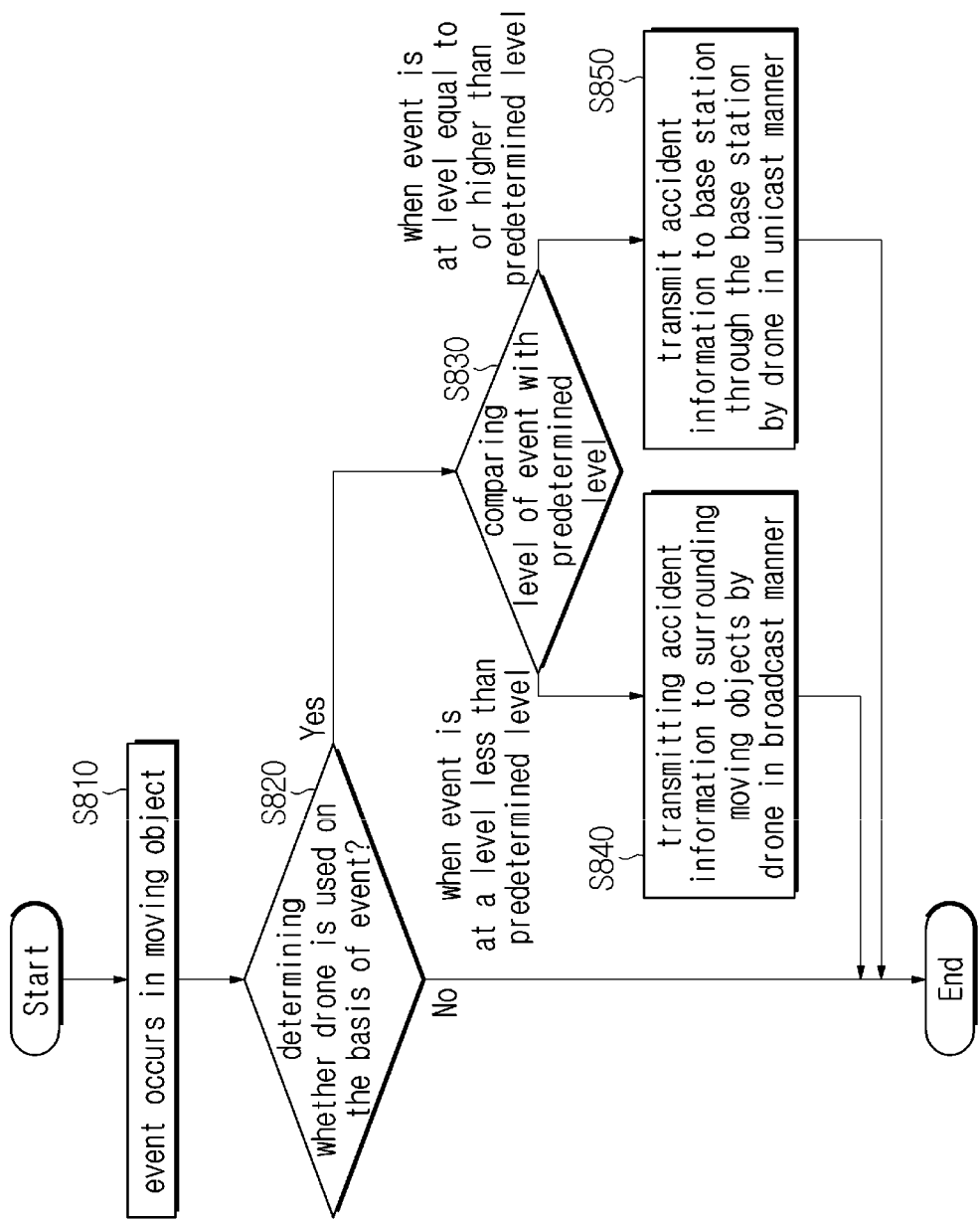
FIG. 8 is a diagram illustrating a method of awakening a drone in a moving object.

FIG. 8 is a diagram illustrating a specific example of the operation according to the present disclosure.

Referring to FIG. 8, an event may occur in a moving object (S810). Herein, the event may be an emergency situation as described above. That is, the event may refer to a case where a drone is switched to an awake state to be separated from a moving object on the basis of a predetermined condition, and is not limited to the above-described embodiment.

Herein, for example, it may be determined whether a drone is used on the basis of the event (S820). For example, when the moving object is capable of using a drone, the moving object may determine whether the event is at a level less than a predetermined level (S830). Herein, whether the event is at a level less than the predetermined level may be determined on the basis of the information measured from the object. As an example, whether the event is at a level less than the predetermined level may be determined on the basis of acceleration/deceleration rate of the moving object. Herein, the acceleration and deceleration of the moving object may be information related to the amount of impact at the time of collision of the moving object. That is, the faster the acceleration or deceleration of the moving object, higher the amount of impact generated on the moving object. Therefore, the moving object may determine whether the event is at a level less than the predetermined level on the basis of the acceleration/deceleration speed of the moving object. Herein, when the acceleration/deceleration speed is smaller than the predetermined speed, the moving object may sufficiently secure the braking distance and the amount of impact may be small, in which the event may be at a level less than the predetermined level. Meanwhile, when the acceleration/deceleration speed is higher than the predetermined speed, the amount of impact generated in the moving object may be large, and herein the event may be at a level exceeding the predetermined level.

As another example, it may be determined whether the event is at a level less than the predetermined level on the basis of shock sensor value of the moving object. For example, when the shock sensor value is smaller than a predetermined value, the moving object may determine that the event is at a level less than the predetermined level. Meanwhile, when the shock sensor value is higher than a predetermined value, the moving object may determine that the event is at a level exceeding the predetermined level. As another example, the moving object may determine whether the event is at a level less than the predetermined level through information associated with the next generation control system using a moving object overturn sensor. In addition, the moving object may determine whether the event is at a level less than the predetermined level in consideration of a room temperature value considering a short circuit or a fire of the moving object lamp. In addition, as an example, the moving object may determine whether the event is at a level less than the predetermined level by another sensor or according to other condition, but the present disclosure is not limited thereto.

Herein, for example, whether the event is at a level less than the predetermined level may be determined with respect to whether the drone operates in the first operation mode or the second operation mode. For example, the predetermined level may be determined on the basis of a plurality of sensors included in the moving object as described above. Herein, when the event is at a level less than the predetermined level, the drone may operate on the basis of the first operation mode. Herein, the drone may be awakened to transmit accident information to surrounding moving objects in a broadcast manner, as described above (S840). In addition, when the event is at a level equal to or higher than the predetermined level, the drone operates on the basis of the second operation mode. Herein, the drone is awakened to transmit a large amount of data to the server through the base station in a unicast manner, by which a specific operation may be performed, as described above (S850).

As another example, consider a case where a drone is forced to be separated from a moving object on the basis of an event. Herein, when the drone is separated in the event, the drone may be switched to an awake state. For example, after a drone is switched to an awake state, information may be exchanged by performing communication with a moving object. Herein, the moving object may provide the drone with information on whether the operation mode is the first operation mode or the second operation mode on the basis of the predetermined level according to the detected information. Through this, the drone may check the operation mode and operate. On the other hand, for example, when a drone is forcibly separated and awakened, the drone may be in a state where communication with the moving object is impossible. For example, the drone may not be able to communicate with the moving object in the case of a breakdown or overturn of the moving object. For example, when the drone is unable to communicate with the moving object, the drone may operate in the second operation mode. That is, when the drone is incapable of communicating with the moving object, the drone may be determined to be in an emergency situation and operate on the basis of the second operation mode as the event is at a level exceeding the predetermined level, but the present disclosure is not limited thereto.

Figure 9:
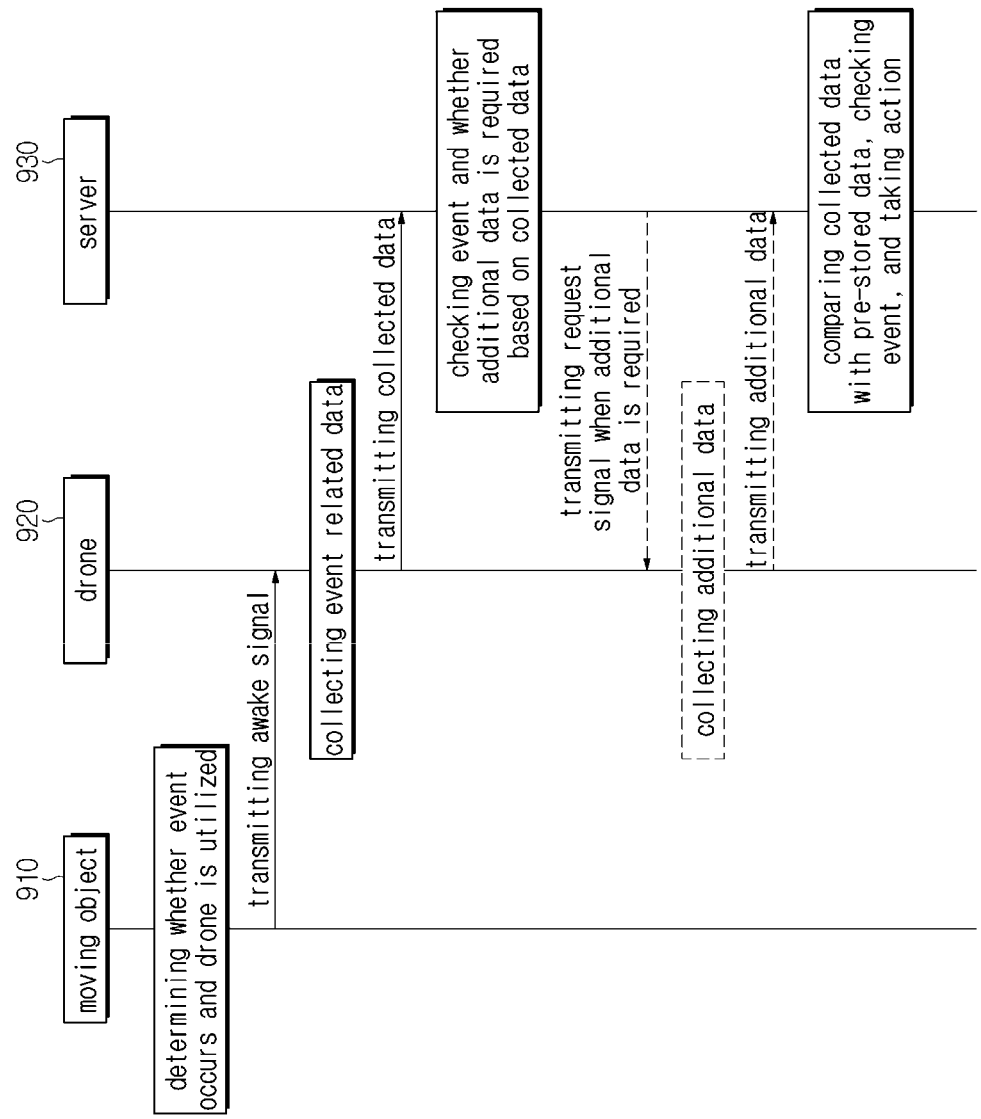
FIG. 9 is a diagram illustrating a method of mounting a plurality of drones on a moving object.

FIG. 9 is a diagram illustrating a method in which a drone collects event related information and transmits the information to a server.

Referring to FIG. 9, when an event occurs in the moving object 910, it may be determined whether the drone 920 may be utilized. Herein, for example, the determination as to whether drone 920 is utilized may be as shown in FIG. 8. For example, when the airbag is activated in the moving object 910, the drone 920 may be activated. In addition, as an example, when an abnormality occurs in a sensor included in the moving object 910, the drone 920 may be activated. Herein, the event may be an accident occurring in the moving object 910 or an unusual matter occurring in the other moving object 910, but the present disclosure is not limited thereto. That is, when an event occurs in the moving object 910 and the drone 920 is determined to be utilized with respect to the predetermined information, the moving object 910 may activate the drone 920. Herein, for example, the moving object 910 may transmit a signal for activating the drone 920 to the drone 920. That is, the moving object 910 may transmit the awake signal to the drone 920. Thereafter, the drone 920 may switch from the sleep state to the awake state to perform a flight. Herein, the drone 920 may collect data related to the event. As a specific example, information related to the sensor in the moving object 910 and the inside of the moving object 910 may be directly checked by the moving object 910 and transmitted to the server 930. Herein, for example, the server 930 may mean a server of an organization related to the moving object 910, a rescue organization, or another organization for managing moving objects, but the present disclosure is not limited thereto. That is, the server 930 may be a subject that receives information about an event of the moving object 910.

Herein, For example, it is necessary to check external state information of the moving object 910 on the basis of the event. For example, the external state information may be time information. Also, as an example, the external state information may be information related to external temperature or whether there is an external fire. In addition, the external state information may be information capable of being checked outside the moving object 910, but the present disclosure is not limited thereto. Herein, the drone 920 may be activated to collect data related to the event while performing a flight. As a specific example, the drone 920 may capture an image of a moving object related to an event while flying around the moving object. In addition, as an example, the drone 920 may also capture an image around a moving object. For example, when the moving object 910 collides with another moving object, the drone 920 may capture image information of another moving object. In addition, as an example, when the moving object 910 collides with the guard rail, the drone 920 may capture image information about the guard rail. That is, the drone 920 may acquire image information about the outside of the moving object 910. In addition, as an example, the drone 920 may further measure fire or temperature information around the moving object 910, but the present disclosure is not limited thereto. That is, the drone 920 may collect data outside the moving object 910 with respect to the event. Herein, the drone 920 may transmit the collected data to the server 930. Herein, the server 930 may check an event occurring in the moving object 910 on the basis of the data collected from the drone 920. For example, the server 930 may include pre-stored information related to the event. Herein, For example, the previously stored information may be information about an event occurring in another moving object. In more detail, the server 930 may pre-store image information related to a moving object accident. Herein, the server 930 may compare the pre-stored image information with image information collected from the drone 920. As a specific example, the server 930 may pre-store a plurality of images on the basis of an artificial intelligence (AI) system. Herein, the server 930 may continuously acquire an event related image of the moving object. For example, as described above, the server 930 may receive image information collected through the drone 920 as an input and continuously update information about an event on the basis of machine learning. Thereafter, the server 930 may continuously perform the update while matching the collected image information with the event. For example, as the event-related information in the server 930 increases, the event determination accuracy of the server 930 increases.

Herein, the server 930 may check the event through the pre-stored data through the AI system on the basis of the data collected from the drone 920. For example, when the server 930 may check the event on the basis of the information collected from the drone 920, the server 930 may perform an additional action on the basis of the determined event. As an example, the additional action may be an action that is set for each event. As a specific example, the server 930 may transmit a signal to an insurance company or a rescue organization, and request a dispatch service. As another example, the server 930 may transmit information necessary for processing an event to a user of a moving object in which an event occurs, but the present disclosure is not limited thereto.

Meanwhile, the server 930 may not be able to identify the event on the basis of the information collected from the drone 920. Herein, the server 930 may make a request for additional data to the drone 920 through an additional data request signal. As a specific example, the server 930 may check the insufficient data with respect to the event, and include the insufficient data related information in the request message to transmit the same to the drone 920. Herein, the drone 920 may obtain necessary additional data on the basis of the received request message. For example, the drone 920 may acquire necessary information on the basis of the insufficient data related information included in the request message. Thereafter, the drone 920 may further transmit the collected data to the server 930. Herein, the server 930 may stop the request for additional data, when event identification is possible on the basis of the collected data. Meanwhile, when the server 930 may not identify an event, the server 930 may request related information from the drone 920, but the present disclosure is not limited thereto.

As another example, the server 930 may further request event related information from the drone 920 on the basis of a predetermined period. More specifically, even when the server 930 identifies the event, time series additional information may be needed considering the event processing procedure. That is, the drone 920 may secure data around the moving object 910 continuously or for a predetermined period from the time when the event occurs. Herein, the server 930 receives the above-described information from the drone 920, by which the information on the event processing procedure may be confirmed in real time. Herein, the server 930 may perform necessary actions for the event on the basis of the information confirmed in real time, whereby it is possible to perform control on the event. In addition, as an example, the server 930 or the drone 920 may transmit event related information to at least one of moving objects and devices around the moving object 910. For example, the server 930 may check the location information of the moving object 910 as well as the event information of the moving object 910. Herein, the server 930 may transmit information about an event to at least one of surrounding moving objects and devices located within a predetermined distance from the moving object 910. Accordingly, the surrounding moving objects may check the event occurring in the moving object 910. In addition, as an example, the above information may be transmitted by the drone 920. For example, the drone 920 performs the flight turning around the moving object 910, and may directly transmit event-related information to the moving object 910 and at least one of surrounding moving objects and devices located at a predetermined distance, but the present disclosure is not limited thereto.

Figure 10:
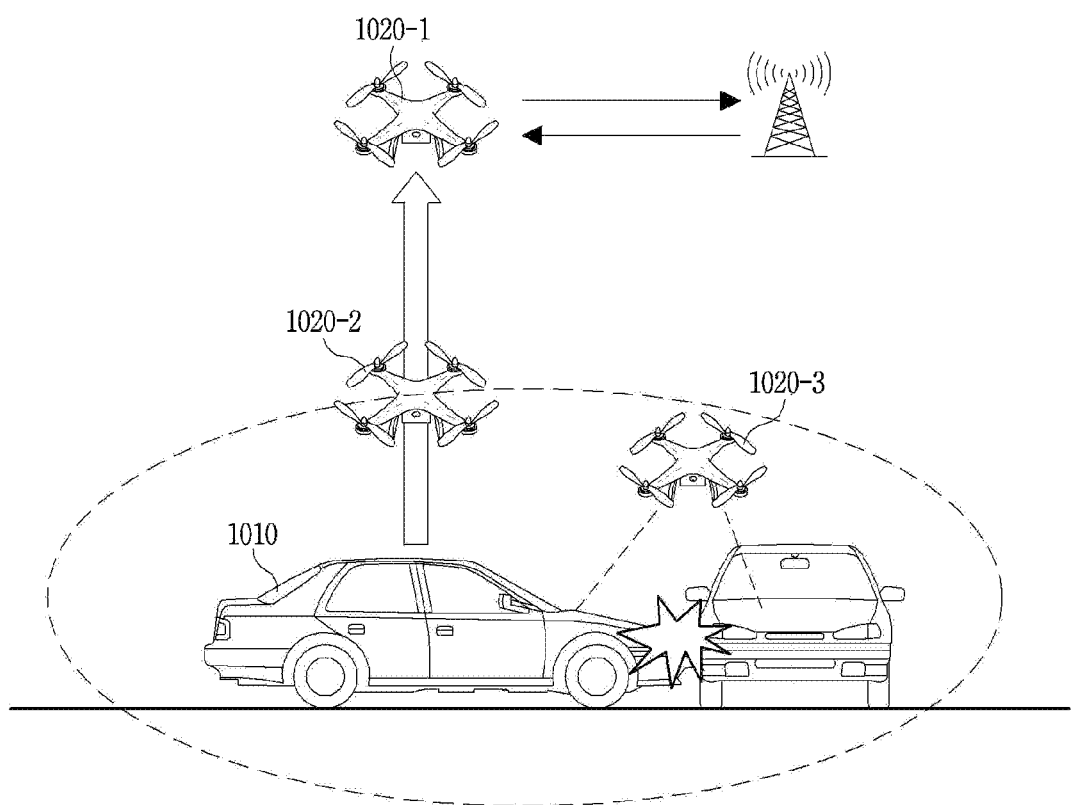
FIG. 10 is a diagram illustrating a drone operating method when a collision of a moving object occurs.

FIG. 10 is a diagram illustrating a method in which a moving object uses a plurality of drones.

Referring to FIG. 10, a plurality of drones 1020-1, 1020-2, and 1020-3 may be mounted on the moving object 1010. Herein, for example, when the moving object 1010 detects an event or emergency situation as described above, the plurality of drones 1020-1, 1020-2, and 1020-3 are awakened to be separated from the moving object 1010.

More specifically, when an emergency situation occurs in the moving object 1010, accident information needs to be obtained as soon as possible. To this end, the moving object 1010 is equipped with a plurality of drones 1020-1, 1020-2, and 1020-3, the respective drones 1020-1, 1020-2, and 1020-3 may perform respective functions. Herein, the first drone 1020-1 is awakened when an event (e.g., traffic accident) occurs and thus functions to communicate with a base station and thus deliver related information to the base station. In addition, the second drone 1020-2 is awakened when an event (e.g., a traffic accident) of the moving object 1020 occurs, and thus turns around to collect image information of a field situation, and to transmit the same through communication with a base station, thereby controlling the accident scene situation. In addition, the third drone 1020-3 functions to deliver information indicating that an event (e.g., accident) has occurred in the moving object 910 to other vehicles approaching from the rear, in which the third drone 1020-3 may move to the rear of the accident occurrence point to transmit information on the front situation to other surrounding moving objects through the LED display board or the lighting device.

As a specific example, the first drone 1020-1 mounted on the moving object 1010 may communicate with a base station and transmit related information to a server. To this end, the first drone 1020-1 may be separated from the moving object 1010 and rise vertically from the moving object 1010 to perform a stop flight. In addition, as an example, the second drone 1020-2 mounted on the moving object 1010 may acquire image information around the moving object 1010. To this end, the second drone 1020-2 may perform a flight turning around the moving object 1010, thereby obtaining an image around the moving object 1010. Meanwhile, the first drone 1020-1 and the second drone 1020-2 may communicate with each other, and the second drone 1020-2 may transmit the obtained information to the first drone 1020-1. Herein, the first drone 1020-1 may transmit information obtained from the second drone 1020-2 to the server through the base station, thereby performing specific accident processing.

As another example, the third drone 1020-3 may be further mounted on the moving object. Herein, the third drone 1020-3 may transmit information on an emergency situation to other moving objects around the moving object. For example, the third drone 1020-3 may communicate with the first drone 1020-1 in a different manner. As a specific example, the first drone 1020-1 may perform message transmission in a unicast manner similar to the second operation mode as described above. Meanwhile, the third drone 1020-3 may perform message transmission in a broadcast manner similar to the first operation mode as described above, but the present disclosure is not limited thereto. Also, as an example, the moving object may be equipped with a plurality of drones in consideration of various functions, but the present disclosure is not limited thereto.

Figure 11:
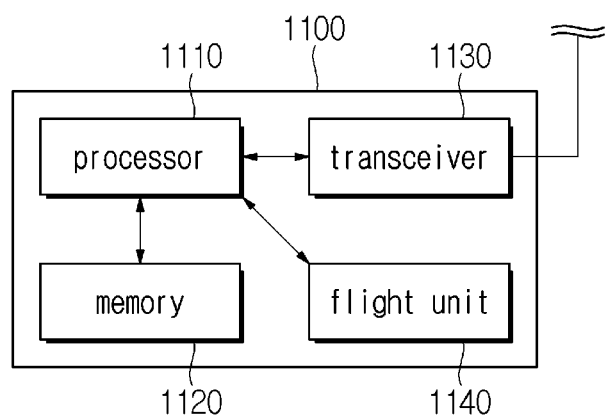
FIG. 11 is a diagram illustrating a configuration of an apparatus for the drone.

FIG. 11 is a diagram showing a drone according to an embodiment of the present disclosure. For example, the drone 1100 may include at least one of a processor 1111, a memory 1120, a transceiver 1130, and a flight unit 1140. Herein, for example, the above-described configuration may be a software configuration or a hardware configuration. That is, the above-described configuration in the drone 1100 may be implemented or mounted in a physical form, but the present disclosure is not limited thereto. Herein, the processor 1110 may control the memory 1120, the transceiver 1130, and the flight unit 1140. In addition, the processor 1110 may be configured to control operations related to the drone. In addition, the memory 1120 may store information related to the drone 1100 or information processed by the processor 1110. In addition, as an example, the memory 1120 may store information obtained through the transceiver 1130, but the present disclosure is not limited thereto. In addition, the transceiver 1130 may be configured to communicate with another drone or another device. For example, the processor 1110 may control the transceiver 1130 to transmit data to another drone or a device, but the present disclosure is not limited thereto. In addition, the flight unit 1140 may be configured to control the flight of the drone 1100. For example, the flight unit 1140 may be a hardware configuration. In addition, as an example, the flight unit 1140 may control an operation related to the flight of the drone, but the present disclosure is not limited thereto.

Figure 12:
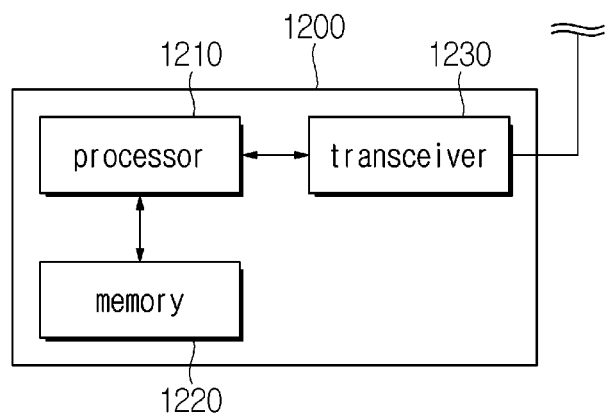
FIG. 12 is a diagram illustrating the configuration of the apparatus.

FIG. 12 is a diagram showing a configuration of an apparatus. Referring to FIG. 12, the apparatus may include at least one of the moving object, device, server, and RSU that are above-described. That is, the apparatus may be engaged with another device to communicate with the same, but the present disclosure is not limited thereto. For example, the apparatus 1200 may include at least one of a processor 1210, a memory 1220, and a transceiver 1230 for the purpose of the above-described operation. That is, the apparatus may include a configuration necessary for communicating with another apparatus. Also, as an example, the apparatus may include other components in addition to the above-described configuration. That is, the apparatus is configured to perform communication with other devices, but the present disclosure is not limited thereto and may operate on the basis of the foregoing.

While the example methods of the present disclosure described above are represented as a series of operations for clarity of description, it is not intended to limit the order in which the steps are performed, and each step may be performed simultaneously or in a different order as necessary. In order to implement the method according to the present disclosure, the illustrated step may further include other steps, may include remaining steps except for some steps, or may include other additional steps except for some steps.

The aforementioned operations/functions may be embodied as computer readable code/algorithm/software stored on a non-transitory computer readable recording medium, such as the memory 1120 and/or memory 1220. The computer readable recording medium is any data storage device that can store data which can thereafter be read by a computer or a processor/microprocessor such as the processor 1110 and/or processor 1210. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The processor 1110 and/or processor 1210 may perform the above described operations/functions, by executing the computer readable code/algorithm/software stored on the non-transitory computer readable recording medium.

The various embodiments of the present disclosure are not an exhaustive list of all possible combinations, and are intended to describe representative aspects of the present disclosure, and the matters described in the various embodiments may be applied independently or in combination of two or more.

In addition, various embodiments of the present disclosure may be implemented by hardware, firmware, software, or a combination thereof. The hardware may be implemented by one or more of application specific Integrated Circuits (ASICs), Digital Signal Processors (DSPs), Digital Signal Processing Devices (DSPDs), Programmable Logic Devices (PLDs), Field Programmable Gate Arrays (FPGAs), a general processor, a controller, a microcontroller, a microprocessor, and the like.

It is intended that the scope of the disclosure includes software or machine-executable instructions (e.g., an operating system, an application, firmware, a program, etc.) that causes an operation in accordance with various embodiments to be executed on an apparatus or a computer, and non-transitory computer-readable media that are executable on a device or computer in which such software or instructions, and the like are stored.

What is claimed is:

1. A moving object on which a drone is mounted, the moving object comprising:
   a transceiver configured to transmit and receive a signal; and
   a processor configured to control the transceiver,
   wherein the processor is configured to:
      detect occurrence of an event in response to an abnormality or an emergence situation, the abnormality occurring in the moving object and the emergence situation being recognized,
      determine whether to use the drone on the basis of the detected event, and
      determine an operation mode, among a first operation mode and a second operation mode, of the drone when the drone is used,
   wherein the processor is configured to transmit event related information using the drone in at least one of the first operation mode and the second operation mode.

2. The moving object of claim 1, wherein the drone is configured to remain in a sleep state before the moving object detects the occurrence of the event; and
   the drone is configured to, when the moving object detects the occurrence of the event, switch from the sleep state to an awake state.

3. The moving object of claim 2, wherein the drone is configured to, when the drone is switched to the awake state, start a flight and output at least one of an ultrasonic wave or an electromagnetic wave.

4. The moving object of claim 2, wherein the drone is configured to, when the drone is switched to the awake state, start a flight to collect data related to the event, and transmit the collected data to a server.

5. The moving object of claim 4, wherein the drone is configured to collect the data related to the event during the flight; and
   the data related to the event includes at least one of image information external to the moving object or image information surrounding the moving object.

6. The moving object of claim 4, wherein the drone is configured to transmit the collected data to the server to cause the server to compare previously stored data with data related to the received event and to identify the event on the basis of the compared information.

7. The moving object of claim 1, wherein the moving object is configured to detect the occurrence of the event, on the basis of at least one of a case in which an airbag installed in the moving body is operated, a case in which a user input is detected for an emergency button installed on the moving object, or a case in which the occurrence of the event is detected through at least one sensor installed on the moving object.

8. The moving object of claim 1, wherein the drone is configured to, when the moving object detects the event and then detects a user input via a human machine interface (HMI), operate on the basis of the first operation mode.

9. The moving object of claim 8, wherein the drone is configured to, when the moving object detects the event and then does not detect the user input via the HMI, operate on the basis of the second operation mode.

10. The moving object of claim 8, wherein the HMI is configured to detect the user input through at least one of a gesture, a user touch input, a user button input, or biometric information; and
the biometric information includes at least one of a brain wave, respiration, a pulse rate, or a heart rate.

11. The moving object of claim 1, wherein the moving object is configured to obtain location information about the moving object; and
in a case that the moving object is located in a first area predetermined on the basis of the location information, the drone is configured to, when the event is detected, operate on the basis of the first operation mode.

12. The moving object of claim 11, wherein in a case that the moving object is located in a second area predetermined on the basis of the location information, the drone is configured to, when the event is detected, operate on the basis of the second operation mode.

13. The moving object of claim 12, wherein the moving object is configured to, when the operation mode of the drone is the first operation mode, transmit a first message including the information in a broadcast manner using the drone to at least one moving object within a predetermined range from the moving object; and
the moving object is configured to, when the operation mode of the drone is the second operation mode, transmit a second message including the event related information to a base station in a unicast manner by using the drone.

14. The moving object of claim 13, wherein the first message including the event related information includes at least one of location information of the moving object or transmission type information indicating the broadcast manner; and
the moving object is configured to transmit the first message including the event related information to the at least one moving object within a predetermined range on the basis of a local area network without the base station.

15. The moving object of claim 13, wherein the second message including the event related information includes at least one of moving object ID information, location information, or data.

16. The moving object of claim 15, wherein the base station provides the event related information to at least one of moving objects located within a predetermined distance from the moving object, the server, and a device associated with the moving object, on the basis of the moving object ID information and the location information of the second message including the event related information.

17. The moving object of claim 1, wherein the moving object is equipped with a plurality of the drone including a first drone and a second drone;
the plurality of drones are configured to, when the moving object detects the event, switch to the awake state;
the first drone of the plurality of drones is configured to acquire image information on the moving object through a flight turning around the moving object; and
the second drone of the plurality of drones is configured to communicate with at least one of the moving object, another moving object, a device, or a base station, and exchanges information about the event.

18. A method of operating a moving object on which a drone is mounted, the method comprising:
detecting, by a processor of the moving object, occurrence of an event in response to an abnormality of an emergence situation, the abnormality occurring in the moving object and the emergence situation being recognized;
determining, by the processor of the moving object, whether to use the drone on the basis of the detected event;
determining, by the processor of the moving object, an operation mode, among a first operation mode and a second operation mode, of the drone when the drone is used; and
transmitting, by the processor of the moving object, event related information using the drone in at least one of the first operation mode and the second operation mode.

* * * * *